(12) United States Patent
Olsson

(10) Patent No.: US 11,367,153 B2
(45) Date of Patent: Jun. 21, 2022

(54) DEVICE FOR SCOUTING A CONSTRUCTION SITE FOR CONSTRUCTION DEVICE DEPLOYMENT

(71) Applicant: HUSQVARNA AB, Huskvarna (SE)

(72) Inventor: Tommy Olsson, Molndal (SE)

(73) Assignee: HUSQVARNA AB, Huskvarna (SE)

( * ) Notice: Subject to any disclaimer, the term of this patent is extended or adjusted under 35 U.S.C. 154(b) by 431 days.

(21) Appl. No.: 15/446,056

(22) Filed: Mar. 1, 2017

(65) Prior Publication Data

US 2017/0256005 A1 Sep. 7, 2017

(30) Foreign Application Priority Data

Mar. 2, 2016 (SE) .................................. 1650279-1

(51) Int. Cl.
| | | |
|---|---|---|
| *G06Q 50/08* | (2012.01) | |
| *G06Q 10/06* | (2012.01) | |
| *E02F 9/26* | (2006.01) | |
| *G06Q 50/16* | (2012.01) | |

(52) U.S. Cl.
CPC ..... *G06Q 50/08* (2013.01); *G06Q 10/063114* (2013.01); *E02F 9/261* (2013.01); *G06Q 50/165* (2013.01)

(58) Field of Classification Search
CPC .......... G06Q 50/08; G06Q 10/063114; G06Q 50/165; E02F 9/261
See application file for complete search history.

(56) References Cited

U.S. PATENT DOCUMENTS

| | | | | |
|---|---|---|---|---|
| 1,731,719 | A * | 10/1929 | Kempton ................ | B24B 49/18 451/64 |
| 2008/0248725 | A1* | 10/2008 | Craycraft ................ | B24B 7/188 451/340 |
| 2010/0022168 | A1* | 1/2010 | Kilgren ................... | B24B 7/186 451/6 |
| 2014/0154959 | A1* | 6/2014 | Van Der Veen ........ | B24B 7/005 451/350 |
| 2014/0316837 | A1* | 10/2014 | Fosburgh ......... | G06Q 10/06312 705/7.22 |
| 2016/0163088 | A1* | 6/2016 | Clar ......................... | G01C 7/02 701/23 |
| 2016/0170411 | A1* | 6/2016 | Wei ....................... | E02F 9/2054 701/25 |
| 2016/0321763 | A1* | 11/2016 | Shike ..................... | G06Q 50/08 |

(Continued)

FOREIGN PATENT DOCUMENTS

WO        2014188221 A2    11/2014

OTHER PUBLICATIONS

Advanced Engineering Informatics, vol. 29, Issue 2, Apr. 2015; Status quo and open challenges in vision-based sensing and tracking of temporary resources on infrastructure construction sites. (Year: 2015).*

(Continued)

*Primary Examiner* — Timothy Padot
*Assistant Examiner* — Francis Z. Santiago Merced
(74) *Attorney, Agent, or Firm* — Burr & Forman LLP

(57) ABSTRACT

A construction site status monitoring device is provided including processing circuitry configured to receive sensor data associated with a construction site from a scout device and generate a site map based on the sensor data for deployment of the construction device.

14 Claims, 5 Drawing Sheets

(56) References Cited

U.S. PATENT DOCUMENTS

2017/0175362 A1* 6/2017 Iwanaga ............... E02F 9/264
2017/0198459 A1* 7/2017 Stratton ............... E02F 9/24

OTHER PUBLICATIONS

B. Kahane, Y. Rosenfeld "Real-time "Sense-and-Act" operation for construction robots" In: Automation in Construction, Elsevier Science Publishers, Amsterdam, NL, vol. 13, No. 6, pp. 751-764, ISSN 0926-5805, Nov. 1, 2004.

R. Berlin, F. Weiczer "Development of a multi-purpose mobile robot for concrete surface processing" In; Automation and Robotics in Construction XL Proceedings of the 11th International Symposium on Automation and Robotics in Construction (ISARC), Elsevier, Amsterdam, Netherlands, pp. 133-140, ISBN 0-444-82044-2, May 26, 1994.

* cited by examiner

US 11,367,153 B2

DEVICE FOR SCOUTING A CONSTRUCTION SITE FOR CONSTRUCTION DEVICE DEPLOYMENT

CROSS REFERENCE TO RELATED APPLICATIONS

This application claims priority to Swedish application number 1650279-1 filed Mar. 2, 2016, the entire contents of which are hereby incorporated by reference in its entirety.

TECHNICAL FIELD

Example embodiments generally relate to construction equipment and, more particularly, relate to scouting a construction site for deployment of a construction device.

BACKGROUND

Construction equipment includes such devices as saws, drills, generators, demolition robots, grinders, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, grinding, polishing, or the like.

In some instances, construction devices, such as saws, grinders, nail guns, panel hangers, or the like may be operated in a construction site. The operator may have to perform a survey of the construction site to determine the orientation or condition of various aspects of the site, such as orientation of walls, floors, ceiling, paneling installed/not installed, relief cuts, or the like. Surveying the construction site may be a time and labor intensive activity. The operator may also need to compare the survey of the construction site to site plans and determine what operations need to be performed to make the construction site match the site plan. Further, the operator may then need to determine the order of operations to perform, how to navigate construction devices through a construction site, building material limitations, and/or working element changes. These considerations and planning steps may also be time and labor intensive.

BRIEF SUMMARY OF SOME EXAMPLES

In an example embodiment, a construction site status monitoring device is provided including processing circuitry configured to receive sensor data associated with a construction site from a scout device, and generate a site map based on the sensor data for deployment of the construction device.

In another example embodiment, a construction site status monitoring system is provided including a scout device comprising a sensor, a construction device, and a construction site status monitoring device. The construction site status monitoring device includes processing circuitry configured to receive sensor data associated with a construction site from the scout device, and generate a site map based on the sensor data for deployment of the construction device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
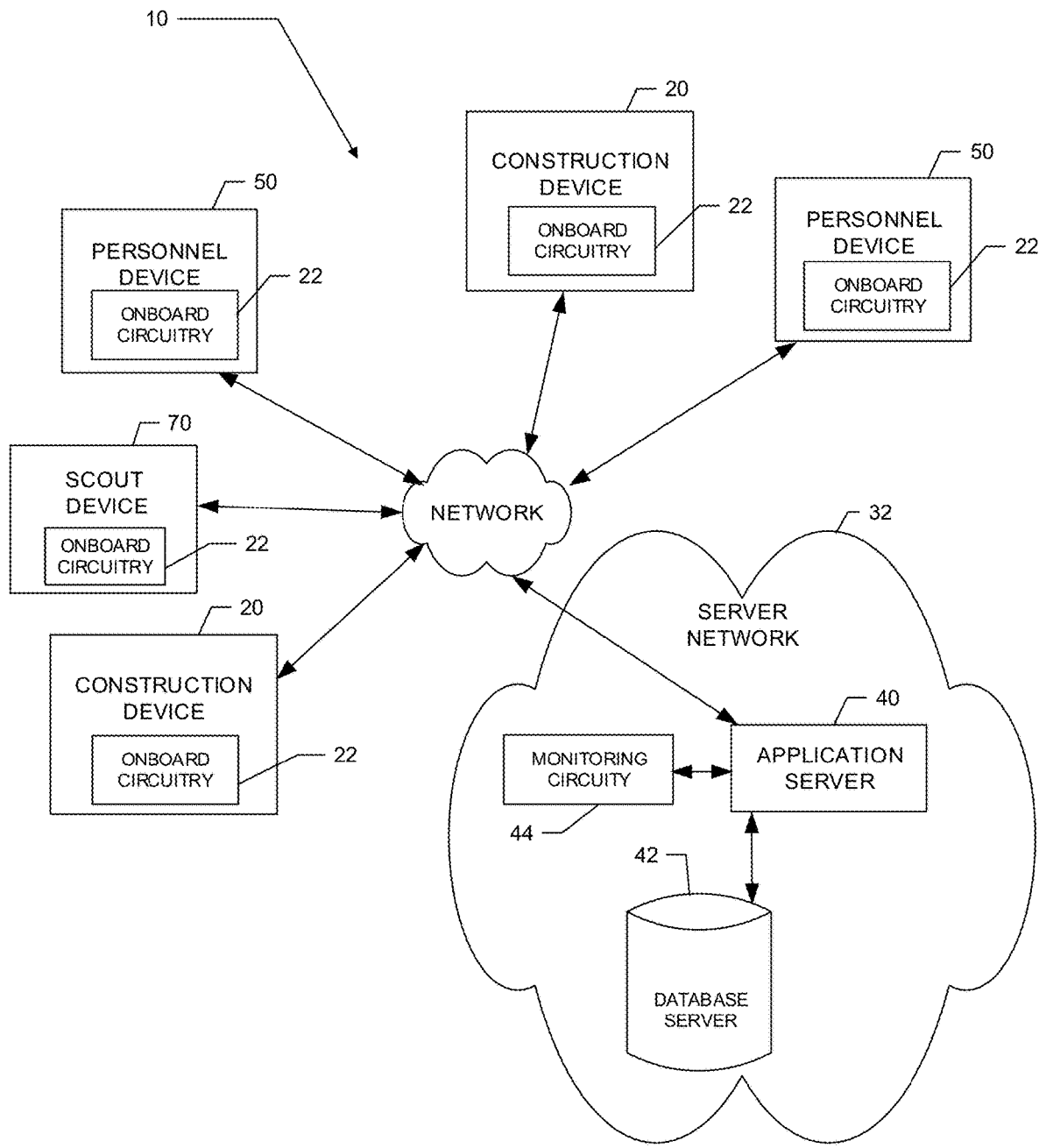
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different pieces of construction devices or personal devices. The construction site status monitoring device may employ a scout device to survey the construction site using one or more sensors. The construction site status monitoring device may automatically generate a site map and, in some instances, cause the working element of the construction device to be deployed based on the site map.

In some example embodiments, the construction site status monitoring device may also compare the site map to the site plan, determine job types and locations, and/or determine work routes. In an example embodiment, the site map may be displayed on a graphic user interface. The site map may include localized deviations from the surrounding area, large deviations from the surrounding area, and deviations from the site plan. In an example embodiment, the site map may include the job types and locations and/or the work route.

The operator may use the displayed site map to monitor the construction device automatic operation, adjust the operation, or manually operate the construction device.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20, personnel devices 50 and scout devices). Notably, although FIG. 1 illustrates five devices 20, 50, 70 it should be appreciated that many more devices 20, 50, 70 may be included in some embodiments and thus, the five devices 20, 50, 70 of FIG. 1 are simply used to illustrate a multiplicity of devices 20, 50, 70 and the number of devices 20, 50, 70 is in no way limiting to other example embodiments. In this regard, example embodiments are scalable to inclusion of any number of devices 20, 50, 70 being tied into the system 10. Moreover, it should be appreciated that FIG. 1 illustrates one example embodiment in which shared resources may be allocated within a community of networked devices (e.g. devices 20, 50, 70). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50, 70 that are associated with corresponding specific servers that belong to or are utilized by a particular organization, entity or group over a single network (e.g. network 30). However, in other embodiments, multiple different sets of devices 20, 50, 70 may be enabled to access other servers associated with different organizations, entities or groups via the same or a different network.

The devices 20, 50, 70 may, in some cases, each include sensory, computing and/or communication devices associated with different devices 20, 50, 70 that belong to or are associated with a single organization, for example fleet management of devices 20, 50 at a construction site. In another example, a first device 20, 50 may be associated with a first facility or location of a first organization. Meanwhile, a second device may be associated with a second facility or location of the first organization. As such, for example, some of the devices 20, 50, 70 may be associated with the first organization, while other ones of the devices 20, 50, 70 are associated with a second organization. Thus, for example, the devices 20, 50, 70 may be remotely located from each other, collocated, or combinations thereof. However, in some embodiments, each of the devices 20, 50, 70 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a work element. The working element may be operated via the power unit to perform construction operations, such as drilling, cutting, demolishing, nailing, or the like. Various example types of construction devices 20 with which example embodiments may be associated should be understood to have corresponding different types of working elements (e.g. blades, cutting chains, drill bits, nailers, or the like). The construction devices 20 may include sensors for monitoring location, device operation, orientation, or the like, as discussed below in reference to FIG. 2. The construction devices 20 may include a mobility assembly, such as wheels or tracks. In an example embodiment, the construction devices 20 may be manually operated or may be embodied in a robotic vehicle. In an instance in which the construction devices 20 are embodied in a robotic vehicle, the construction devices 20 may operate automatically or by remote control to move to various locations using the mobility assembly.

Figure 2:
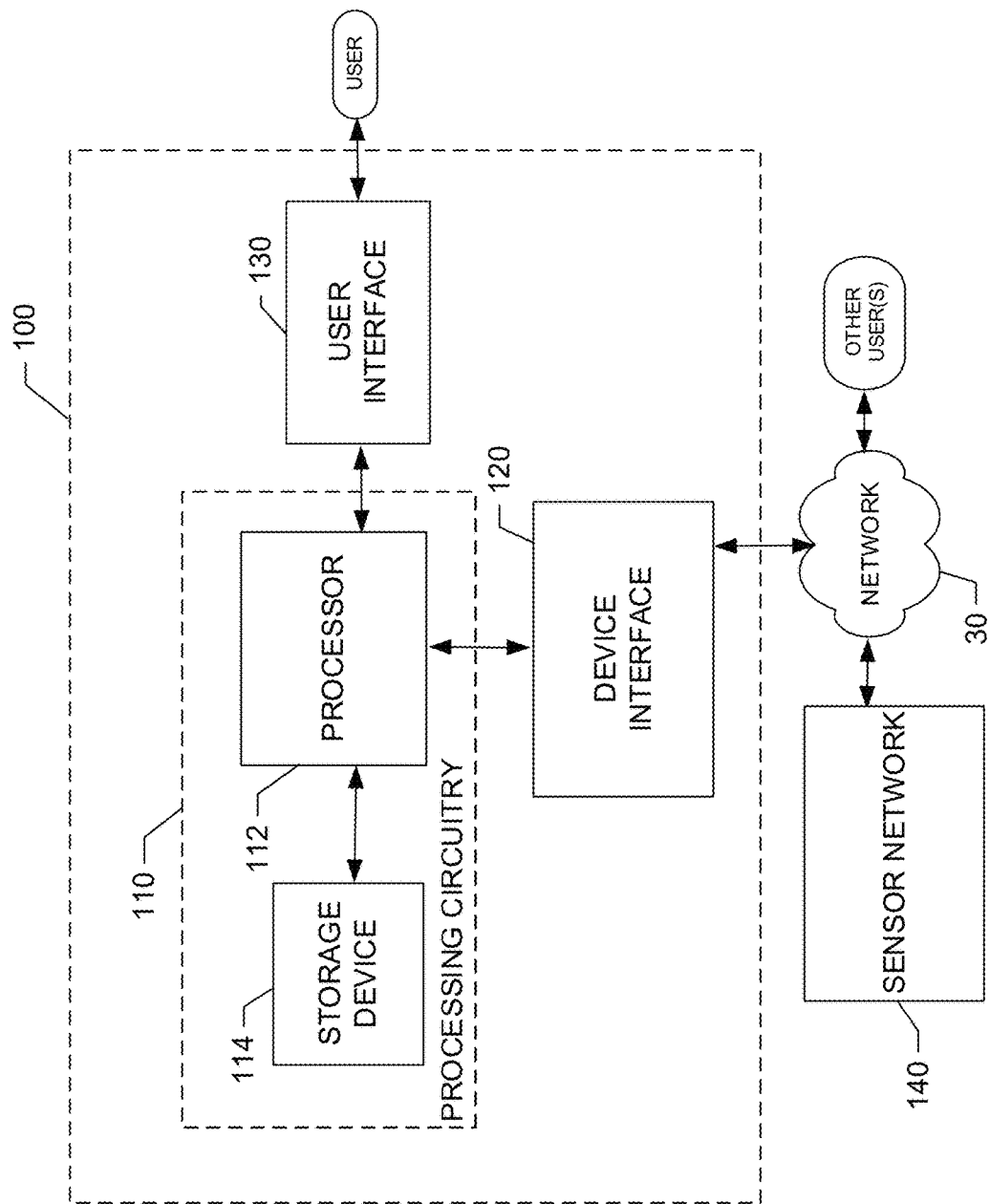
FIG. 2 illustrates a block diagram of one example of onboard electronics or monitoring circuitry that may be used in connection with employment of an example embodiment.

Each of the personnel devices 50 may include sensors, such as location sensors, cameras, scanners, or the like and/or a user interface, as discussed below in reference to FIG. 2.

The scout device 70 may include a mobility assembly, such as wheels, tracks, or aerial propulsion, or the like. The scout device 70 may also include one or more sensors to detect the conditions of a construction site, such as location, orientation, and or surface features of floors, walls, construction devices, obstructions, or the like.

In an example embodiment, each of the devices 20, 50, 70 may include onboard circuitry 22 which may include or otherwise be embodied as a computing device (e.g. a processor, microcontroller, processing circuitry, or the like) capable of communication with a network 30. As such, for example, each one of the devices 20, 50, 70 may include (or otherwise have access to) memory for storing instructions or applications for the performance of various functions and a corresponding processor for executing stored instructions or applications and a corresponding processor or processing circuitry. Each one of the devices 20, 50, 70 may also include software and/or corresponding hardware (e.g. the onboard circuitry 22) for enabling the performance of the respective functions of the clients as described below. In an example embodiment, one or more of the devices 20, 50, 70 may be configured to execute applications or functions implemented via software for enabling a respective one of the devices 20, 50, 70 to communicate with the network 30 for requesting and/or receiving information and/or services via the network 30 and/or for providing data to other devices via the network 30. The information or services receivable at the devices 20, 50, 70 may include deliverable components (e.g. downloadable software to configure the onboard circuitry 22 of the devices 20, 50, 70, or information for consumption or utilization at the onboard circuitry 22 of the devices 20, 50, 70).

The network 30 may be a data network, such as a local area network (LAN), a metropolitan area network (MAN), a wide area network (WAN) (e.g. the Internet), and/or the like, which may couple the devices 20, 50, 70 to devices such as processing elements (e.g. personal computers, server computers or the like) and/or databases. Communication between the network 30, the devices 20, 50, 70 and the devices or databases (e.g. servers) to which the devices 20, 50, 70 are coupled may be accomplished by either wired or wireless communication mechanisms and corresponding communication protocols.

In an example embodiment, other devices to which the devices 20, 50, 70 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50, 70) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to construction site status (CSS) identification, as will be described in greater detail below. For example, the application server 40 may be local or remote and configured to receive data from the devices 20, 50, 70 and process the data to coordinate construction site operations, as described herein. Thus, for example, the onboard circuitry 22 may be configured to send the data to the application server 40 for the application server to coordinate construction site operations (e.g. monitor and/or deploy personnel and/or device 20, 50, 70 to locations throughout the construction site), or have actions associated therewith (e.g. send information, alerts, or safety interlocks to devices 20, 50, 70). In some embodiments, the application server 40 may be configured to provide devices 20, 50, 70 with instructions (e.g. for execution by the onboard circuitry 22) for taking prescribed actions when corresponding CSSs are identified.

Accordingly, in some example embodiments, data from devices 20, 50, 70 may be provided to and analyzed at the application server 40 to identify or define a CSS (e.g. in real time or at a later time). The CSS may be associated with actions to be taken by the corresponding one of the devices 20, 50, 70 that sent the data (or another device within the construction site) in response to a future detection of the CSS. The application server 40 may then equip one or more of the devices 20, 50, 70 to detect the defined CSS in the future, and also provide instructions for actions to be taken when the defined CSS is encountered. Each one of the devices 20, 50, 70 that has received the instructions may then detect the defined CSS and take the appropriate action. In an example embodiment, the CSS may include generating a site map for deployment of a construction device based on sensor data received from a scout device.

Alternatively or additionally, data from devices 20, 50, 70 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more devices 20, 50, 70 when an occurrence of the defined CSS is detected in the future.

In still other embodiments, the devices 20, 50, 70 themselves may analyze data for detection of CSSs (e.g. using the onboard circuitry 22) and define and/or take action responsive to detecting the occurrence of a defined CSS. Thus, the devices 20, 50, 70 may operate in some cases independently of the network 30 and the application server 40. However, in some cases, the application server 40 may be used to provide defined CSSs to the devices 20, 50, 70 and the devices 20, 50, 70 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with an embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device 100 may be embodied in a device construction device 20, a personnel device 50, a separate computing device, or be distributed among the devices 20, 50, and/or a separate computing device. The CSS monitoring device 100 may include processing circuitry 110 of an example embodiment as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the devices 20, 50, 70. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50, 70), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like. In some example embodiments, the user interface 130 may include remote user interfaces, such as a display on a personnel device 50, for example a smart phone or personal data assistant.

The device interface 120 may include one or more interface mechanisms for enabling communication with other devices (e.g. sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g. a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application. In some cases, the applications may include instructions for recognition of patterns of activity and for initiation of one or more responses to the recognition of any particular pattern of activity as described herein. Additionally or alternatively, the applications may prescribe particular reporting paradigms or protocols for reporting of information from the outdoor power tool activity monitoring device 100 to a network device using the device interface 120.

In some embodiments, the processing circuitry 110 may communicate with electronic components and/or sensors of a sensor network 140 (e.g. sensors that measure variable values related to device operational parameters like RPM, temperature, oil pressure, and/or the like; sensors that measure device movement employing movement sensor circuitry) of the construction device 20 via the device interface 120; and/or level orientation, or surface sensors that measure the relative location, orientation and surface features of ceiling walls, floors, or the like. In one embodiment, sensors of the sensor network 140 of one or more ones of the devices 20, 50, 70 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50, 70 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50, 70 based on data provided by the one or more accelerometers and/or gyroscopes, and/or based on GPS or local position determining capabilities. In other words, the movement sensor circuitry may be configured to detect movement of the device 20, 50, 70 based on inertia-related measurements or other location determining information. In some example embodiments, the movement sensor circuitry may include orientation sensors, configured to detect the orientation of a device, particularly the working element of the device relative the a determined location.

Figure 3:
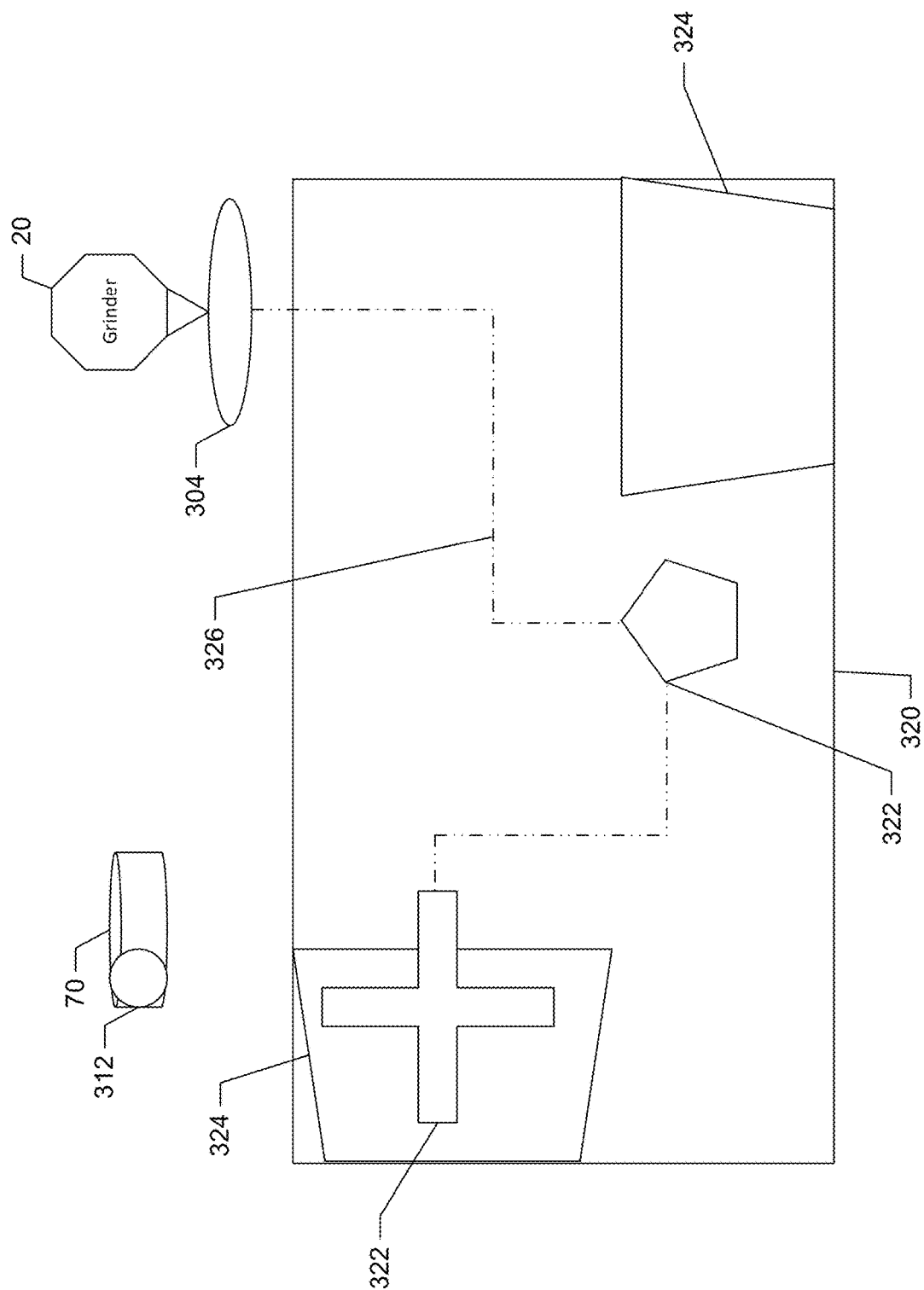
FIG. 3 illustrates an example construction site according to an example embodiment.

FIG. 3 illustrates an example construction site 320 according to an example embodiment. The construction site 320 may include one or more construction devices 20, such as, floor grinders, saws, nailers, jackhammers, or the like. The construction device 20 may include a working element 304, such as grinder, a blade, nail driver, or the like, configured to perform work such as grinding, cutting, nailing, or the like in the construction site 320. In an example embodiment, a CSS may include generating a site map for deployment of a construction device based on sensor data from a scout device, as discussed below.

In an example embodiment, the scout device 70 may include a wheeled or aerial device. The scout device 70 may also include one or more sensors 312 configured to detect the conditions of the construction site 320. A user or the CCS monitoring device 100 may cause the scout device to enter the construction site 320 and collect sensor data using sensors 312 (e.g. a portion of the sensor network 140). In some embodiments, the scout device may be remotely controlled by the user and/or the CSS monitoring device 100 to navigate the constructing site 320. Additionally or alternatively, the scout device 70 may navigate the construction site autonomously.

The scout sensors 312 may include level sensors; still or moving image cameras; three dimensional scanners, such as laser, infrared, or ultrasonic; location sensors; proximity sensors; or the like. The CSS monitoring device 100 may receive the sensor data 70 from the scout device 70. The scout device 70 may collect sensor data indicative of the orientation of a construction site floor based on data from a level sensor. The scout device 70 may generate still or moving image sensor data from a camera, which may be utilized for object recognition and three dimensional modeling. In some embodiments, the scout device 70 or CSS monitoring device 100 may use sensor data from three dimensional scanner to generate a three dimensional model of the construction site 320. In some example embodiments, the location sensor may collect location data indicative of the actual location, e.g. GPS, of the scout device 70 in the construction site 320. In other embodiments, the location sensor or proximity sensor may collect proximity data indicative of a proximate location of the scout device 70 to a beacon, such as a radio frequency identification (RFID beacon), mounted in the construction site 320, construction device 20, and/or the CSS monitoring device 100. The scout device 70 or CSS monitoring device 100 may determine surface feature data from the still or moving images, three dimensional model, and/or location data.

In an example embodiment, the CSS monitoring device 100 may generate a site map based on the sensor data. The site map may include the orientations and surface features, e.g. topography, of floors, walls, or ceiling, obstructions, and/or construction devices 20 in a two dimensional coordinate system (x,y) or three dimensional coordinate system (x,y,z). The orientation of the floor walls and/or ceiling may include localized deviations 322 from the surrounding area, such as ridges, bulges, and/or pits. In some example embodiments, the orientation of the floor, wall, and/or ceiling may include large deviations 324 from the surrounding area, such as inclines, declines, pitches, or the like.

Figure 4:
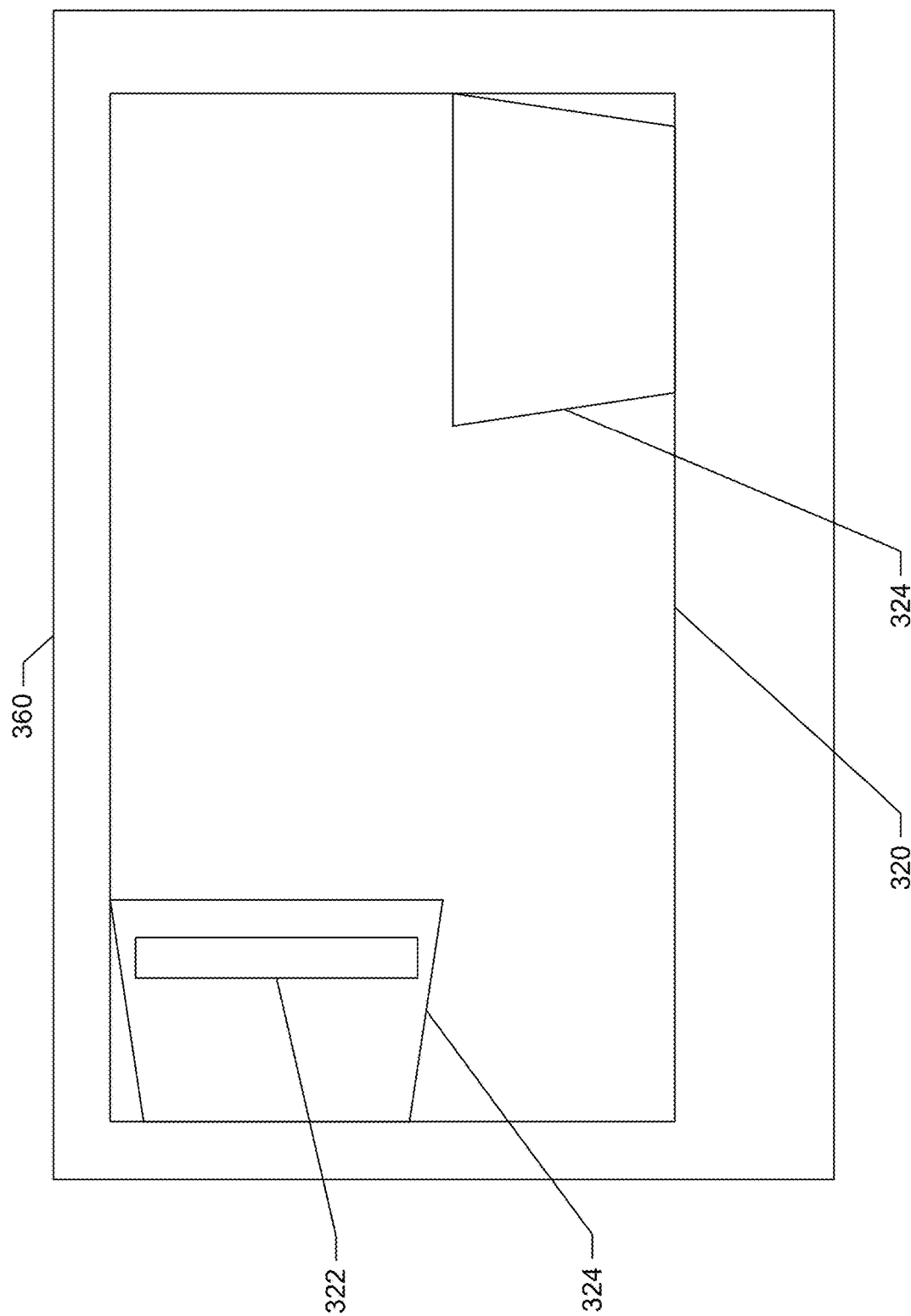
FIG. 4 illustrates a material site plan according to an example embodiment.

In some embodiments, the CSS monitoring device 100 may receive a site plan 360, such as depicted in FIG. 4. The CSS monitoring device 100 may receive the site plan 360 from a local memory, such as storage device 114, or a remote memory, such as database server 42. The site plan 360 may be the intended, desired, final, and/or predetermined outcome of the construction site 320 relating to the orientation, consistency, shape size, or the like of various components, e.g. large deviations and localized deviations. The site plan 360 may include the desired orientation or surface consistency of a floor, walls, or ceiling of the construction site 320. The site plan 360 may include desired large deviations 324, e.g. inclines/declines, and local deviations 322. For example, the site plan 360 may include a floor with one or more ramps, e.g. large deviations 324, which may include one or more traction ridges, e.g. a local deviation 322.

In an example embodiment, the CSS monitoring device 100 may compare the site map to the site plan 360. The CSS monitoring device 100 may identify deviations from the site plan 360 in the site map based on the comparison.

In some example embodiments, the CSS monitoring device 100 may cause the site map to be displayed on a graphic user interface, such as user interface 130. The user interface 130 displaying the site map may be associated with a personnel device 50 associated with an operator of the construction device 20, the CSS monitoring device 100, or the construction device 20. In an example embodiment, the site map may include the deviations from the site plan 360.

In an example embodiment, the CSS monitoring device 100 may determine one or more job types and locations in the construction site 320 based on the site map. For example, in an instance in which the construction device 20 is a floor grinder, jobs may include grinding smooth, grinding at an incline, grinding a pit, or the like. The CSS monitoring device 100 may determine job types and location based on local deviations 322, large deviation 324, and/or in deviations from the site plan 360 in the site map. In an example embodiment, the job types may be associated with a predetermined symbol, number, or color code.

In some example embodiments, the CSS monitoring device 100 may determine a work route 326 for the construction device 20 based on the site map and/or the job types and locations. The work route 326 may be determined to minimize distance traveled by the machine, avoid obstructions or other construction device 20, organize job types, or the like. In some example embodiments, organizing job types includes prioritizing jobs to prevent performing unnecessary jobs, for example grinding an incline prior to smoothing localized bulges in the same area. In some examples, the work route 326 may be based on the working element 304 currently attached to a construction device 20, materials, such as nails, screws, paneling, drywall, or the like available at the construction site 320 or loaded in the construction device 20. For example, if a coarse grinder is currently affixed the work route 326 may perform all coarse grinding jobs, return to a maintenance area to change working elements to a fine grinder, and then perform fine grinding jobs. In another example, the construction device 20 may be loaded with a number of wall or ceiling panels and fasteners, such as nails or screws, the work route 326 may be based on the jobs which may be completed by the currently loaded materials prior to returning to a loading location, to optimize load times.

In an example embodiment, the CSS monitoring device 100 may cause the work route 326 and/or the jobs types and location data to be displayed on the graphic user interface 130. The work route 326 and/or job types and locations may be overlaid on the site map.

Additionally or alternatively, the CSS monitoring device 100 may determine a work cost estimate which may be useful in generating a quote or price for the work. The work cost estimate may include the cost, such as dollar amount to perform the work and/or the factors, such as size of the site, tools required, time for completion, labor costs, or the like. The work cost estimate may be based on the site map, deviations, from the site plan, work route, or the like.

In an example embodiment, the CSS monitoring device 100 may cause the working element 304 of the construction device 20 to be deployed based on the site map. In some example embodiments, the CSS monitoring device 100 may cause the construction device 20 to execute the work route and/or the job types at the specified locations.

Additionally or alternatively, an operator may manually control or adjust the automatic control of the deployment of the working element 304 of the construction device 20 based on the displayed site map.

Although primarily discussed in reference to a floor grinder, one of ordinary skill in the art would immediately appreciate that the generation of the site map for deployment of the working element 304 of the construction device 20 may be applied to any number of other construction devices, such as saws, demolition robots, fasteners, or the like.

Figure 5:
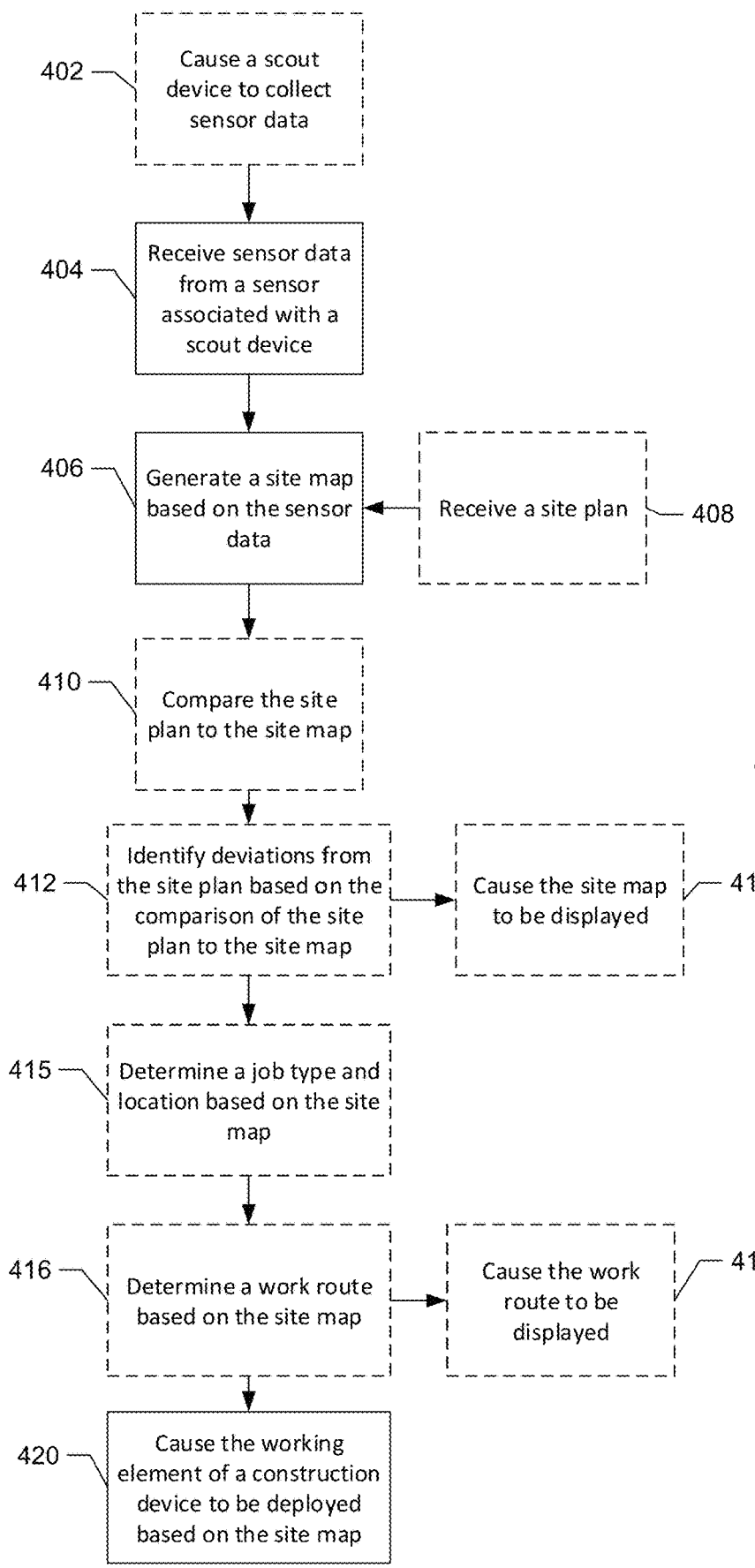
FIG. 5 illustrates a method of utilizing construction site status monitoring device in relation to operation of construction device according to an example embodiment.

In some cases, a method of utilizing CSS analysis in relation to operation of the CSS monitoring device 100, one or more construction devices 20, and one or more scout devices 70 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction tools according to the method.

In an example embodiment, the method may include receiving sensor data associated with a scout device at operation 404 and generating a site map based on the sensor data at operation 406.

In some embodiments, the method may include additional, optional operations, and/or the operations described above may be modified or augmented. Some examples of modifications, optional operations, and augmentations are described below, as indicated by dashed lines, for example causing the scout device to collect sensor data at operation 402, receiving a site plan at operation 408, and comparing the site plan to the site map at operation 410. In some example embodiments, the method may also include identifying deviations from the site plan based on the comparison of the site plan and site map. In an example embodiment, the method may also include causing the site map to be displayed at operation 414, determining a job type and location based on the site map at operation 415, and determining a work route based on the site map at operation 416. In an example embodiment, the method may further include causing the work route to be displayed at operation 418 and causing a working element of a construction device to be deployed based on the site map at operation 420.

In an example embodiment, the CSS monitoring device may comprise a processor (e.g. the processor 112) or processing circuitry 110 configured to perform some or each of the operations (402-420) described above. The processor 112 may, for example, be configured to perform the operations (402-420) by performing hardware implemented logical functions, executing stored instructions, or executing algorithms for performing each of the operations. In some embodiments, the processor 112 or processing circuitry 110 may be further configured for additional operations or optional modifications to operations 402-420. In this regard, for example in an example embodiment, wherein the processing circuitry is further configured to cause the scout device to collect the sensor data associated with the construction site. In some example embodiments, the processing circuitry is further configured to cause a working element of the construction device to be deployed based on the site map. In an example embodiment, the processing circuitry is further configured to receive a site plan, compare the site plan to the site map, identify deviations from the site plan based on the comparison of the site plan and site map, and cause the working element of the construction device to be deployed based on the site map and the deviations from the site plan. In some example embodiments, the processing circuitry is further configured to determine a job type and location based on the site map. In an example embodiment, the processing circuitry is further configured to determine a work route based on the site map. In some example embodiments, the processing circuitry is further configured to cause the work route to be displayed on a graphic user interface. In an example embodiment, the processing circuitry is further configured to cause a working element of a construction device to be deployed based on the work route. In some example embodiments, the sensor data is indicative of the orientation or topography of a floor of the construction site. In some example embodiments, the processing circuitry is further configured to cause the site map to be displayed on a graphic user interface. In an example embodiment, the construction device is a floor grinder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A construction site status monitoring device comprising processing circuitry configured to:
  receive sensor data associated with a construction site from a sensor of a scout device;
  generate a site map of the construction site based on the sensor data from the scout device, the site map supporting deployment of a floor grinder comprising a working element configured to drive an interchangeable grinding element, the interchangeable grinding element being a coarse grinding element or a fine grinding element;
  determine, based on the site map, a work route within the construction site and specified locations within the construction site on the work route for performing respective floor grinding operations, wherein the floor grinding operations comprise course floor grinding or fine floor grinding to be performed based on the sensor data associated with the specified locations on the site map and the work route, wherein the work route comprises:
    beginning with floor grinding operations at the specified locations for the interchangeable grinding element currently affixed to the floor grinder, the interchangeable grinding element currently affixed to the floor grinder being one of the course grinding element or the fine grinding element, then returning to a maintenance area to change the interchangeable grinding element currently affixed to the floor grinder to be the other of the course grinding element or the fine grinding element, and then completing floor grinding operations at the specified locations for the other of the course grinding element or the fine grinding element; and send instructions to control the floor grinder to perform the respective floor grinding operations at the specified locations on the work route.

2. The construction site status monitoring device of claim 1, wherein the processing circuitry is further configured to cause the scout device to collect the sensor data associated with the construction site.

3. The construction site status monitoring device of claim 1, wherein the processing circuitry is further configured to:
receive a site plan;
compare the site plan to the site map; and
identify deviations from the site plan based on the comparison of the site plan to the site map;
wherein the processing circuitry is configured to send the instructions to control the working element of the floor grinder based on the deviations from the site plan.

4. The construction site status monitoring device of claim 1, wherein the processing circuitry is further configured to cause the work route to be displayed on a graphic user interface.

5. The construction site status monitoring device of claim 1, wherein the processing circuitry is further configured to cause the site map to be displayed on a graphic user interface.

6. The construction site status monitoring device of claim 1, wherein the scout device comprises wheels or tracks, and the scout device is configured to navigate the construction site on the wheels or tracks to collect the sensor data associated with the construction site.

7. The construction site status monitoring device of claim 1,
wherein the processing circuitry is configured to:
compare the site map to a site plan; and
determine the specified locations on the work route for performing the respective floor grinding operations based on the comparison between the site map and the site plan, the respective floor grinding operations further comprising floor grinding an incline in the floor of the construction site, floor grinding a decline in the floor of the construction site, or grinding traction ridges in the floor of the construction site.

8. The construction site status monitoring device of claim 1, wherein the floor grinder is a robotic vehicle that is configured to automatically perform the respective floor grinding operations using the interchangeable grinding element affixed to the floor grinder at the specified locations on the work route in response to the receiving the instructions.

9. The construction site status monitoring device of claim 1, wherein the construction site is within a space bounded by walls, a floor, and a ceiling.

10. A construction site status monitoring system comprising:
a scout device comprising a plurality of sensors including a location sensor, the scout device being configured to capture sensor data from the location sensor;

a floor grinder having a working element comprising an interchangeable grinding element, the interchangeable grinding element being a coarse grinding element or a fine grinding element; and a construction site status monitoring device comprising processing circuitry configured to:
receive the sensor data associated with a construction site from the scout device;
generate a site map of the construction site based on the sensor data from the scout device, the site map supporting deployment of the floor grinder;
determine, based on the site map, a work route within the construction site; and specified locations within the construction site on the work route for performing respective floor grinding operations, wherein the floor grinding operations comprise course floor grinding or fine floor grinding to be performed based on the sensor data associated with the specified locations on the site map and the work route, wherein the work route comprises:
beginning with floor grinding operations at the specified locations for the interchangeable grinding element currently affixed to the floor grinder, the interchangeable grinding element currently affixed to the floor grinder being one of the course grinding element or the fine grinding element,
then returning to a maintenance area to change the interchangeable grinding element currently affixed to the floor grinder to be the other of the course grinding element or the fine grinding element, and
then completing floor grinding operations at the specified locations for the other of the course grinding element or the fine grinding element; and
send instructions to control the floor grinder to perform the respective floor grinding operations at the specified locations on the work route.

11. The construction site status monitoring system of claim 10, wherein the processing circuitry is further configured to cause the scout device to collect the sensor data associated with the construction site.

12. The construction site status monitoring system of claim 10, wherein the processing circuitry is further configured to:
receive a site plan;
compare the site plan to the site map; and
identify deviations from the site plan based on the comparison of the site plan to the site map;
wherein the processing circuitry is configured to send the instructions to control the floor grinder based on the deviations from the site plan.

13. The construction site status monitoring system of claim 10, wherein the processing circuitry is further configured to cause the work route to be displayed on a graphic user interface.

14. A construction site status monitoring device comprising processing circuitry configured to:
receive sensor data associated with a construction site from a land-based, autonomous scout device having a plurality of sensors including a location sensor for obtaining the sensor data;
generate a site map of the construction site based on the sensor data from the scout device, the site map supporting deployment of a floor grinder comprising a working element configured to drive an interchangeable grinding element affixed to the floor grinder, the interchangeable grinding element being a coarse grinding element or a fine grinding element;

determine, based on the site map and whether an interchangeable grinding element currently attached to the floor grinder is the coarse grinding element or the fine grinding element, a work route within the construction site and specified locations on the work route for performing respective floor grinding operations, wherein the floor grinding operations comprise course floor grinding or fine floor grinding to be performed based on the sensor data associated with the specified locations on the site map and the work route, wherein the work route comprises:

beginning with floor grinding operations at the specified locations for the interchangeable grinding element currently affixed to the floor grinder, the interchangeable grinding element currently affixed to the floor grinder being one of the course grinding element or the fine grinding element, then returning to a maintenance area to change the interchangeable grinding element currently affixed to the floor grinder to be the other of the course grinding element or the fine grinding element, and then completing floor grinding operations at the specified locations for the other of the course grinding element or the fine grinding element, wherein the work route is determined from the site map based on minimizing distance traveled by the floor grinder when traversing the work route; and send instructions to control the floor grinder to perform the respective floor grinding operations at the specified locations on the work route.

* * * * *